(No Model.)

J. CARROLL.
GAS MAKING APPARATUS.

No. 305,510. Patented Sept. 23, 1884.

Witnesses
Chas. H. Smith
J. Staib

Inventor
John Carroll
for Lemuel W. Serrell
atty

UNITED STATES PATENT OFFICE.

JOHN CARROLL, OF SCRANTON, PENNSYLVANIA.

GAS-MAKING APPARATUS.

SPECIFICATION forming part of Letters Patent No. 305,510, dated September 23, 1884.

Application filed March 17, 1884. (No model.)

*To all whom it may concern:*

Be it known that I, JOHN CARROLL, of Scranton, in the county of Lackawanna and State of Pennsylvania, have invented an Improvement in Gas-Making Apparatus, of which the following is a specification.

In apparatus for making water-gas it is usual to supply oil into the top of the generator to be vaporized by the heat of the bed of incandescent fuel, and to combine with the steam and gases passing up through said incandescent fuel. In this operation the bed of incandescent fuel becomes chilled by the oil falling upon the same in a cold liquid condition, and the oil runs in among the coal, so that the gas-making has to be suspended and the apparatus heated up frequently at a considerable loss of time and oil.

My invention is made for supplying the oil into the top of the generator in a highly-heated condition, so that it will vaporize upon entering the generator, and need not fall upon the fuel, but commingles with the water-gas and passes to the superheater and fixer, thus allowing for the manufacture of a much larger volume of gas than heretofore during each gas-making operation.

Figure 1:
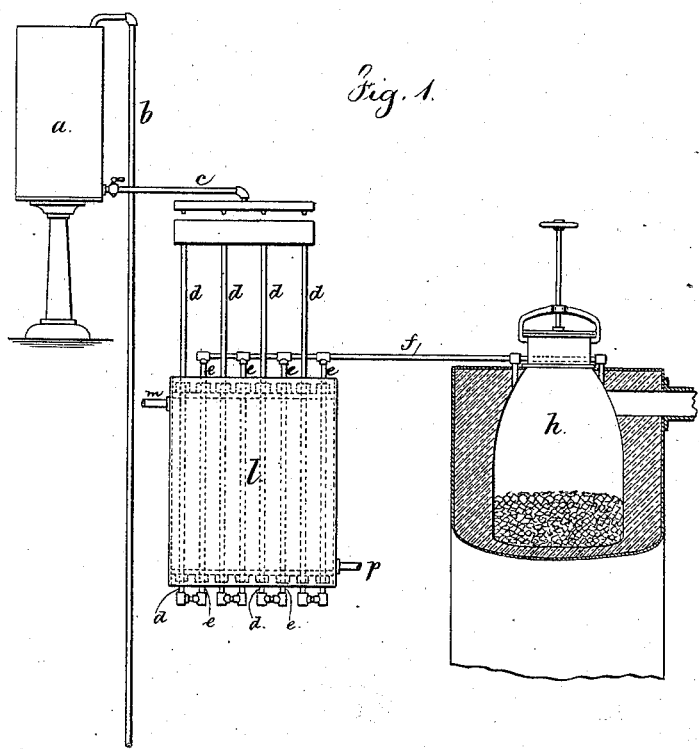
Figure 2:
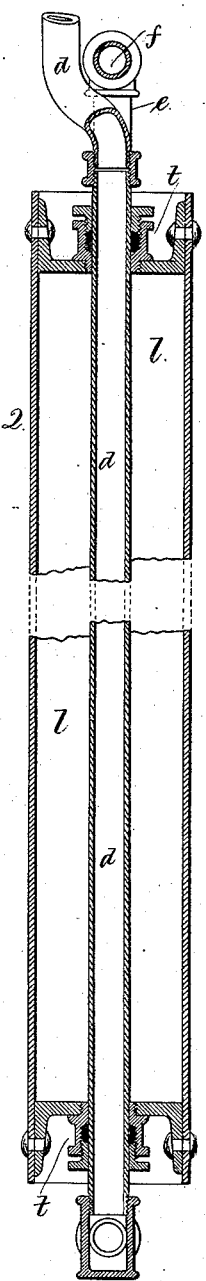

In the drawings, Figure 1 is an elevation of a portion of the gas-making apparatus with my improvement applied thereto, and Fig. 2 is a vertical section of the heater.

The oil-vessel $a$, with its supply-pipe $b$, drip-pipes $c$, and vertical oil-pipes $d$, are similar to those employed in the Lowe water-gas apparatus, and the pipes $d$ have bends or elbows at their lower ends, and the vertical pipes $e$ are connected therewith and rise to the pipe $f$, by which the oil is conveyed into the upper part of the generator $h$. The vertical pipes $d$ $e$ pass through the steam-chamber $l$, which is formed of iron plates riveted together, as shown, the pipes $d$ $e$ being provided with stuffing-boxes $t$ at the top and bottom heads of the steam-chest, so as to allow of expansion and contraction and to prevent leakage. Steam under high pressure or superheated is supplied into the chest $l$ by the pipe or pipes $m$, and passes off, together with any water of condensation, by the pipe $p$. In consequence of applying hot steam around the oil-pipes $d$ $e$, the oil in such pipes becomes highly heated before it reaches the pipe $f$, that conveys it to the generator or superheater; hence the oil vaporizes much more rapidly than when it is cold, and the gas-making operation is prolonged, because the temperature of the apparatus is maintained for a longer period than heretofore.

I do not claim an apparatus in which the liquid hydrocarbon is subjected to the action of heat in its passage to the gas-making apparatus, as this has been made use of. In my apparatus, the vertical range of pipes being surrounded by a case, the ends of the pipes projecting outside the case are easily constructed or repaired, and a high degree of heat is applied to the liquid hydrocarbon in a small space.

I claim as my invention—

1. The combination, in a gas-making apparatus, of the oil-vessel $a$, the pipes $d$, descending from the same, the pipes $e$, and connections at their lower ends to the pipes $d$, and the pipe $f$, connecting at the upper ends of the pipes $e$, and passing to the generator or superheater, the metallic case forming the steam-chamber $l$, through which the pipes $d$ and $e$ pass, and the glands $t$, surrounding said pipes $d$ and $e$, and the pipes $m$ $p$, for conveying steam to such chamber and discharging the water of condensation, substantially as set forth.

2. The steam-chamber $l$, made of plates of iron riveted together, in combination with the oil-pipes $d$ $e$, passing through the same, and the packing-glands $t$, surrounding the pipes at the top and bottom of the steam-chamber, and the oil-vessel and connecting-pipes, substantially as set forth.

Signed by me this 10th day of March, A. D. 1884.

JOHN CARROLL.

Witnesses:
J. M. POORE,
E. F. BOYLE.